(12) United States Patent
Ziemba

(10) Patent No.: US 12,013,033 B2
(45) Date of Patent: Jun. 18, 2024

(54) COMPACT PARK LOCK ASSEMBLY

(71) Applicants: Linamar Corporation, Guelph (CA); Jefferey Ziemba, Novi, MI (US)

(72) Inventor: Jefferey Ziemba, Novi, MI (US)

(73) Assignee: Linamar Corporation, Guelph (CA)

( * ) Notice: Subject to any disclaimer, the term of this patent is extended or adjusted under 35 U.S.C. 154(b) by 123 days.

(21) Appl. No.: 17/642,782

(22) PCT Filed: Sep. 14, 2020

(86) PCT No.: PCT/US2020/050677
§ 371 (c)(1),
(2) Date: Mar. 14, 2022

(87) PCT Pub. No.: WO2021/051061
PCT Pub. Date: Mar. 18, 2021

(65) Prior Publication Data
US 2022/0381341 A1    Dec. 1, 2022

Related U.S. Application Data

(60) Provisional application No. 62/900,111, filed on Sep. 13, 2019.

(51) Int. Cl.
*F16H 63/34* (2006.01)
*B60T 1/00* (2006.01)
(Continued)

(52) U.S. Cl.
CPC .......... *F16H 63/3416* (2013.01); *B60T 1/005* (2013.01); *F16D 63/006* (2013.01);
(Continued)

(58) Field of Classification Search
CPC ............ F16H 63/3416; F16H 63/3425; F16H 63/3433; F16H 63/3466; F16H 63/3059;
(Continued)

(56) References Cited

U.S. PATENT DOCUMENTS

| 5,295,412 A | 3/1994 | Donato et al. |
| 2018/0112774 A1* | 4/2018 | Littlefield ........... F16H 63/3466 |
| 2019/0271394 A1* | 9/2019 | Kramer ................. F16D 63/006 |

FOREIGN PATENT DOCUMENTS

| CN | 202381676 | 8/2012 |
| CN | 202381676 U * | 8/2012 |

(Continued)

*Primary Examiner* — Richard M Lorence
(74) *Attorney, Agent, or Firm* — Miller Canfield

(57) ABSTRACT

A compact park lock assembly configured to be pulled towards a ramped section of a locking lever during actuation to unlock and lock a park lock gear. The compact park lock assembly includes a guide plate configured to align the park lock assembly during assembly, receive input loads from a pinion drive gear arrangement, position and restrain movement of the guide plate, and provide for sensing of the position of the locking lever during operation. The compact park lock assembly also includes an abutment plate to facilitate mounting of the park lock assembly, a spring section to restrain the guide plate, and a clip section to force and retain the abutment plate section to a housing.

21 Claims, 5 Drawing Sheets

(51) Int. Cl.
  *F16D 63/00* (2006.01)
  *F16H 63/30* (2006.01)
(52) U.S. Cl.
  CPC ..... *F16H 63/3425* (2013.01); *F16H 63/3433* (2013.01); *F16H 63/3466* (2013.01); *F16H 2063/3059* (2013.01)
(58) Field of Classification Search
  CPC .......... F16H 63/38; B60T 1/005; B60T 1/062; F16D 63/006
  See application file for complete search history.

(56) References Cited

FOREIGN PATENT DOCUMENTS

| | | | | |
|---|---|---|---|---|
| DE | 102010053861 A1 * | 6/2012 | .............. | B60T 1/005 |
| DE | 102017127358 | 6/2012 | | |
| DE | 102017127358 A1 * | 5/2018 | .............. | B60T 1/005 |
| FR | 2878487 | 6/2006 | | |
| FR | 2878487 A1 * | 6/2006 | .............. | B60T 1/005 |

\* cited by examiner

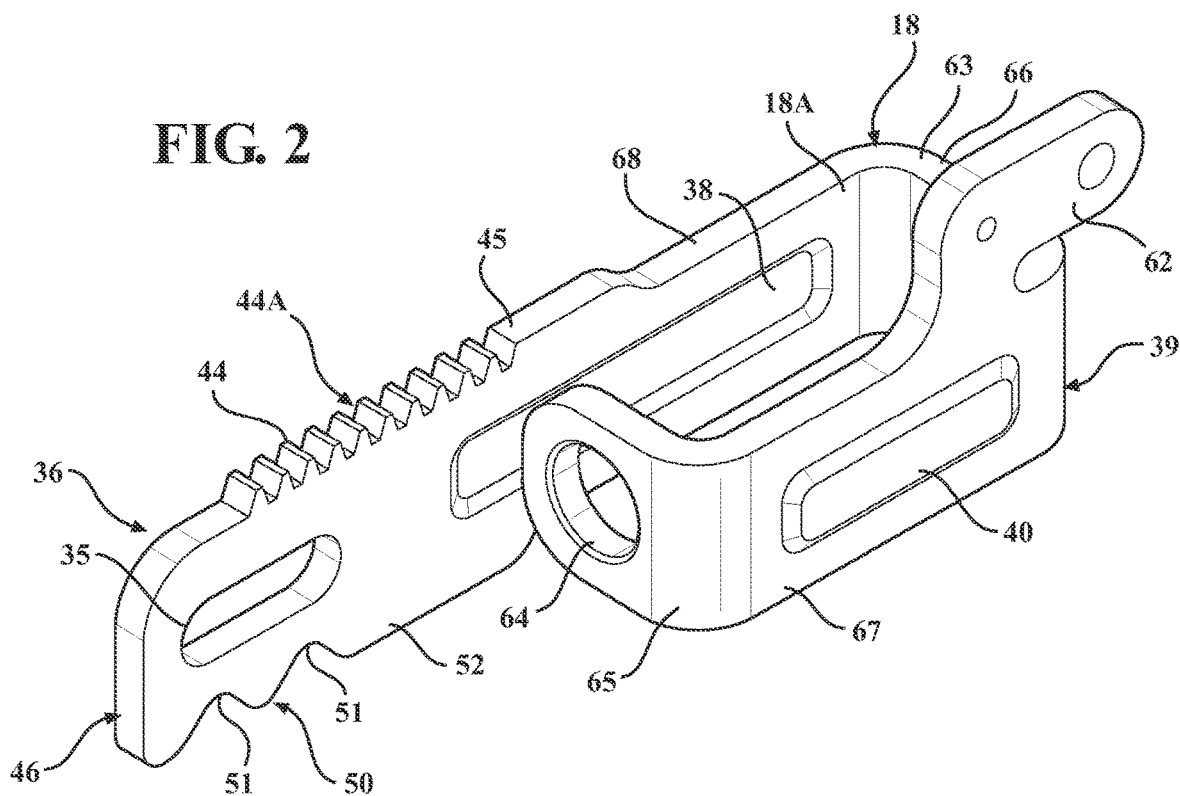
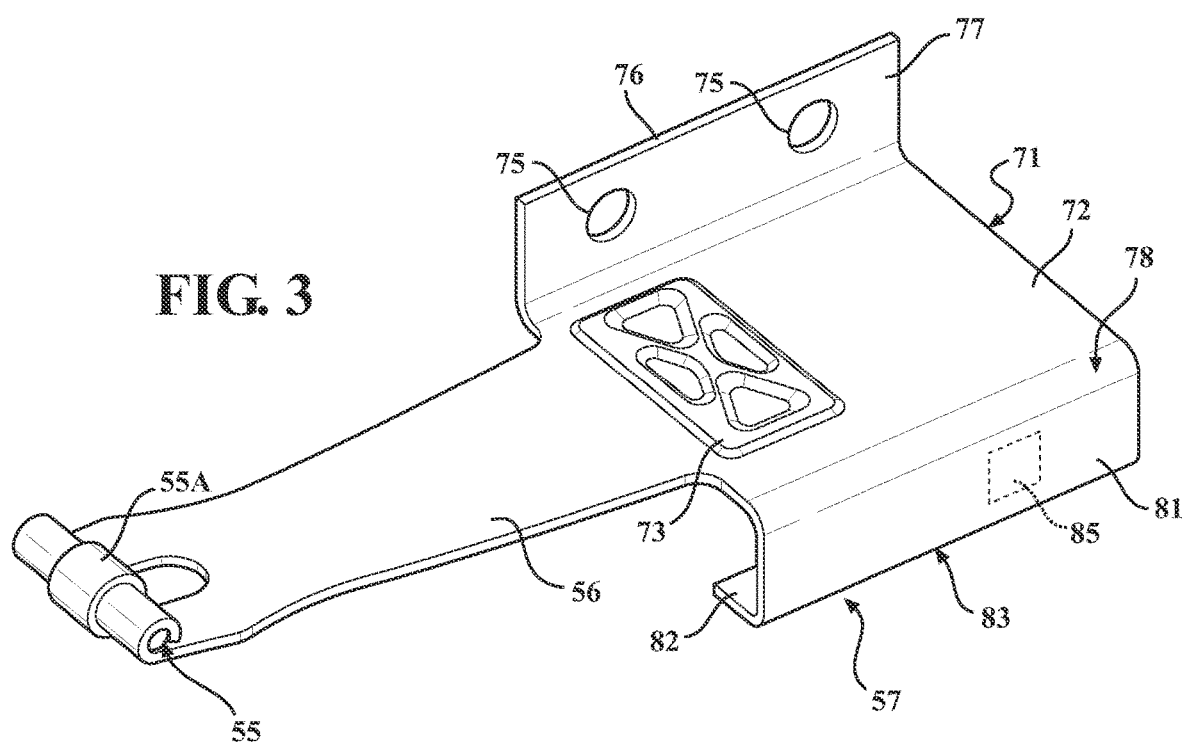

COMPACT PARK LOCK ASSEMBLY

CROSS-REFERENCE TO RELATED APPLICATIONS

This application claims priority to and all the benefits of U.S. Provisional Patent Application No. 62/900,111, filed Sep. 13, 2019, the disclosure of which is hereby incorporated by reference in its entirety.

BACKGROUND OF THE INVENTION

1. Field of the Invention

The present invention relates to a park lock assembly for selectively locking a gear of a vehicle transmission between an unlocked position and a locked, Park, position, and more particularly, to a park lock assembly having a compact assembly formed of multi-function components.

2. Description of the Related Art

It is commonly known for a transmission of a vehicle to include a park lock mechanism for electronically or manually shifting the vehicle into a parked position by locking a gear in the transmission. The park lock mechanism typically includes a shift lever and rod actuated by the vehicle operator for actuating a park lock rod assembly between an unlocked position and a locked position by camming a pawl member into engagement with a parking lock gear to prevent rotation thereof and lock the transmission in a parked position. An example of a park lock mechanism is disclosed in U.S. Pat. No. 5,295,412.

The park lock assembly may include a rod and a spring loaded and captured in a guide member between the shift lever and the pawl member. The park lock rod assembly is typically pushed longitudinally during actuation towards the pawl member to force the pawl member to the locked position with the parking lock gear.

To overcome disadvantages associated with known park lock assemblies, it is desirable to provide a park lock assembly with a roller which is pulled laterally towards the pawl member for actuation between the unlocked and locked, park positions to improve strength and packaging requirements. Furthermore, it is desirable to provide an improved park lock assembly formed in a compact package or assembly to provide for improved manufacture, installation and operation.

SUMMARY OF THE INVENTION

According to one aspect of the invention, a park lock assembly is provided for actuating a pawl into locking engagement with a park lock gear to lock a vehicle transmission in a locked, Park, position. The park lock assembly includes one or more roller(s) and a movable guide plate, wherein at least one roller is attached to the guide plate and moves therewith to actuate a pawl, otherwise known as a locking lever herein. The park lock assembly selectively engages the locking lever, which has a locking tooth for engaging between one of a plurality of teeth on the park lock gear to lock the transmission in a Park position as is known in the vehicle art. The locking lever is typically pivotally mounted to a bracket at one end adjacent the park lock assembly.

In another aspect of the invention, the present invention relates to a park lock assembly which may be pulled towards a ramped section of the locking lever rather than pushed during the actuation between unlocked and locked positions. In more detail, the locking lever of the present invention may include a ramped end engaged by the roller of the park lock assembly wherein displacement of the roller by the guide plate pivots the locking lever between the unlocked and locked, Park, positions. During operation, the roller of the park lock assembly may be pulled towards the ramped end of the locking lever causing the lock lever to engage with the park lock gear to lock the vehicle transmission in the locked position. Pulling the roller(s) rather than pushing allows the pawl to have both a smaller package and more strength due to thicker section where it helps reduce stress.

In a further aspect, the present invention may include a guide plate configured to perform multiple functions including aligning the park lock assembly during assembly, receiving input loads directly from a pinion drive gear arrangement to improve torque transmission, position and restrain movement of the guide plate between the locked and unlocked positions, and provide for sensing of the position of the locking lever during operation. The guide plate may be formed as a single-piece, integrated component or may comprise a multi-piece component in another embodiment.

As an additional component according to a further aspect of the invention, the compact park lock assembly of the present invention may include an abutment plate member which comprises an abutment plate section to facilitate mounting of the compact park lock assembly, a spring section to restrain the guide plate, a clip section to force and retain the abutment plate section to a housing, fastener features to secure the abutment plate member to a housing, and optionally an alignment feature to align the abutment plate member relative to the housing. The abutment plate member may be formed as a single-piece, integrated component or may comprise a multi-piece component in another embodiment.

In view of the foregoing, the present invention has an improved structure integrating these features into a compact package having improved functions. Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a side perspective view of a guide plate of the compact park lock assembly;

FIG. 3 is a side perspective view of an abutment plate member with a combined spring feature;

Figure 1:
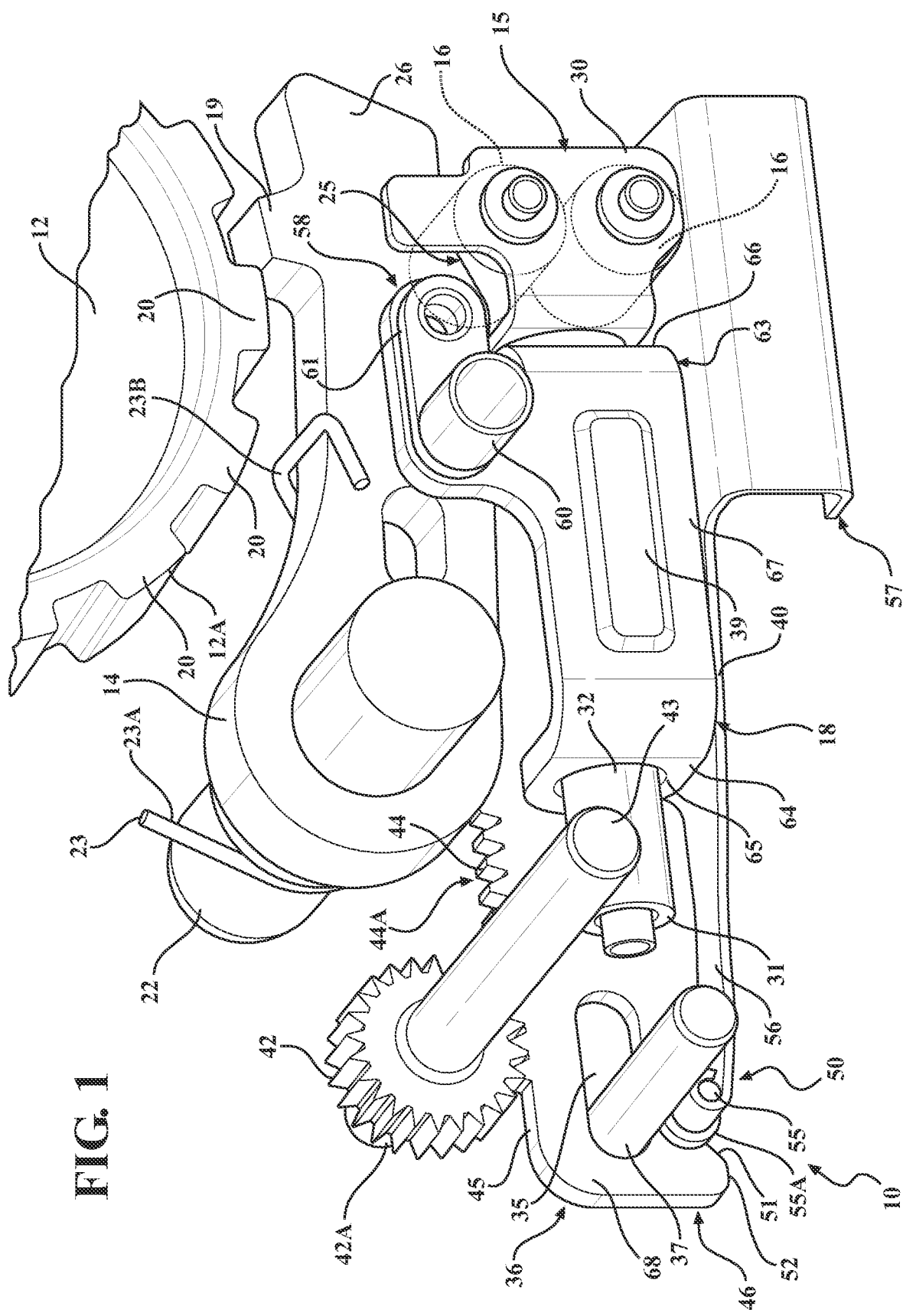
FIG. 1 is a perspective side view of the compact park lock assembly when fully assembled.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the present invention relates to a compact park lock assembly 10 which releasably engages a park lock or locking gear 12 for transferring or actuating a vehicle transmission between an unlocked position and locked, Park, position. The compact park lock assembly 10 reduces the part count and thus the size of the park lock assembly 10 by having parts which serve multiple functions and improve the structure and function thereof.

Referring further to FIG. 1, a compact park lock assembly 10 is provided for actuating a locking lever or pawl 14 into locking engagement with the park lock gear or locking gear 12 to lock a vehicle transmission in the locked, Park, position. The park lock assembly 10 includes a park lock roller assembly 15 comprising one or more roller(s) 16, and includes a guide plate 18, which is movable in a movement direction, wherein the park lock roller assembly 15 is movably attached to the guide plate 18 so as to also move in said movement direction. The roller assembly 15 includes at least one roller 16 that contacts and actuates a pawl, otherwise known as a locking lever 14 herein. The park lock assembly 10 selectively engages the locking lever 14, which has a locking tooth 19 for engaging between one of a plurality of teeth 20 on the park lock gear 12 to lock the transmission in a Park position.

The locking lever 14 may be located adjacent the park lock assembly 10 and may be pivotally mounted at one end to a bracket or housing 21 (as diagrammatically shown in FIG. 4) through pivot pin 22. In the illustrated embodiment, the locking lever 14 extends generally along the length of the park lock assembly 10 in generally parallel relation. Essentially, the guide plate 18 and locking lever 14 extend generally parallel or side by side to each other in the movement direction of the guide plate 18. The locking lever 14 includes a coil spring or other biasing means 23 having spring arms 23A and 23B engaged with the housing and locking lever 14 to normally bias or pivot the locking lever 14 to the unlocked condition of FIG. 1.

In the park lock assembly 10 of the present invention, the roller assembly 15 is generally pulled towards a ramped section 25 of the locking lever 14 rather than pushed during the actuation between the unlocked and locked positions. In more detail, the locking lever 14 of the present invention includes the ramped section 25 on the distal end 26 that is engaged by the adjacent roller 16 of the park lock assembly 10 wherein displacement of the roller 16 sidewardly then pivots the locking lever 14 about pivot pin 22 between the unlocked and locked, Park, positions. During operation, the roller 16 of the park lock assembly 10 contacts and is pulled in the movement direction towards the adjacent ramped end 25 of the locking lever 14 lever causing the locking lever 14 to pivot transverse to the movement direction and engage with the park lock gear 12 to lock the vehicle transmission in the locked position. Pulling the roller(s) 16 rather than pushing allows the pawl-like locking lever 14 to have both a smaller package and more strength due to thicker section where it helps reduce stress.

The park lock roller assembly 15 has a locking lever bracket 30, which rotatably supports the rollers 16 in vertically spaced relation as will be described in more detail herein. The locking lever bracket 30 is connected to a shaft rod 31, which is movably supported by the guide plate 18. The shaft rod 31 extends through a shaft collar 32 and supports a spring member in compression between the shaft collar 32 and the guide plate 18. The park lock roller assembly 15 is axially slidable through the guide plate 18 as discussed below, wherein displacement of the guide plate 18 sidewardly pulls the shaft rod 31 and bracket 30 sidewardly under spring tension to pull the roller 16 in contact with the ramped surface 25 and thereby pivot the locking lever 14 to the locked, Park, position engaged with teeth 20. During unlocking, as the guide plate 18 moves sidewardly and returns to the unlocked position, the guide plate 18 also drives the park lock roller assembly 15 back to the unlocked position.

In this configuration, the park lock assembly 10 including the locking lever 14 is stacked sidewardly adjacent to each other on one common side of the park gear 12. As described further hereinafter, the present invention relates to an improved park lock assembly 10 which is compact and incorporates improvements over prior mechanisms.

Referring in more detail to FIGS. 1 and 2, the present invention comprises a guide plate 18, the guide plate 18 having four primary functions. The first function is to provide alignment in at least the movement direction. This function is achieved via an elongate alignment opening 35 through a first portion 36 of the guide plate 18. A housing dowel 37 is inserted into and extends transversely through the alignment opening 35, and is in fixed engagement with the housing of the compact park lock assembly 10 as diagrammatically shown in FIG. 4. The housing dowel 37 is slidable between the opposite ends of the opening 35, wherein the guide plate 18 is movable along the housing dowel 37 in said movement direction. Further included is a first alignment pad 38 on the first portion 36 and a second alignment pad 39 on a second portion 40 of the guide plate 18. Each alignment pad 38 and 39 acts as a guide for alignment with the lock housing 21.

The second function is to take an input load from an actuator gear pinion 42, which is driven about a drive shaft 43. The drive shaft 43 is generally oriented substantially parallel to the gear axis about which the gear 12 rotates. The actuator gear pinion 42 forms one driven part of a drive unit, which may include other drive components such as a motor which operatively connects to the actuator gear pinion 42 to rotate same. The input load is taken through the interaction between the actuator gear pinon 42 and a set of guide plate teeth 44 forming a rack 44A located on a first edge 45 of a first end 46 of the guide plate 18. The teeth 44 extend in the movement direction and are configured so that the input load is applied to the guide plate 18 generally along the movement direction. The use of a gear pinion drive arrangement directly transfers the rotary drive motion of the pinion gear teeth 42A to the guide plate teeth 44 on the rack 44A, which allows higher loads that are dependent upon and governed by pinion size. Further, drive forces are transmitted in-line along the movement direction with the first edge 45 through the meshed guide plate teeth 44 and the pinion gear teeth 42A. This contributes to a smaller package than known designs that transfer torque into linear motion through pins or levers that are governed by the lever geometry.

The third function is to position and restrain movement of the guide plate 18 during operation and movement between the locked and unlocked positions. This is achieved by a detent feature 50, preferably comprised of a plurality such as two recessed detents 51. The detent feature 50 is located on a second edge 52 of the guide plate 18. The second edge 52 is opposite and may be parallel to the first edge 45. The detent feature 50 interacts with a spring feature 55 of a spring section 56 of an abutment plate member 57 (see FIG. 1). The spring feature 55 is shaped to interlock with the detent feature 50 of the guide plate 18 in order to restrain movement in the locked and unlocked positions. Preferably, the spring feature 55 may comprise a roller 55A. In particular, the spring feature 55 may releasably engage the leftward detent 52 to restrain the guide plate 18 in the unlocked position, and may releasably engage the rightward detent 52 to restrain the guide plate 18 in the locked, Park, position. As noted above, the guide plate 18 may be driven leftwardly and rightwardly by driven rotation of the actuator gear pinion 42 by a suitable actuator such as an electric motor.

Finally the guide plate 18 helps in determining the position of the compact park lock assembly 10 via a sensor unit 58 preferably comprising a sensor 59 that may be on the housing 21 (see FIG. 4) and a position sensor magnet 60 detectably by the sensor 59, although other suitable sensor configurations may be provided. The position sensor magnet 60 is located on the second portion 40 of the guide plate 18 such as by a sensor bracket 61. Preferably, the guide plate 18 includes an upstanding flange 62 that aligns the sensor 60 for detection by the sensor 59 to detect the motion and position of the guide plate 18 and the locking lever 14 during operation. These signals from the sensor 60 may be used to control starting/stopping and rotation direction of the actuator gear pinion 42 to control shifting of the guide plate 18.

As previously described, FIG. 1 shows a locking lever 14 and a locking gear 12. When a locking of the locking gear 12 is desired, the actuator gear pinion 42 pulls the guide plate 18 forward or sidewardly to the left through the interaction between the actuator gear pinion 42 and the set of teeth 44 on the first edge 45 of the guide plate 18. The guide plate 18 is operatively attached to and cooperates with the locking lever 14 through the rollers 16 supported by the locking lever bracket 30 of the roller assembly 15. The locking lever bracket 30 is located at a second end 63 of the guide plate 18, the second end 63 being opposite the first end 46. The locking lever bracket 30 also is formed with the shaft rod 31, which extends through an opening 64 in each end wall 65 and 66 of the second portion 40 of the guide plate 18. As seen in FIG. 2, the end walls 65 and 66 are joined by a first side wall 67 in which the alignment pad 39 is formed, wherein the end walls 65 and 66 and side wall 67 form an open interior 18A, which opens upwardly toward the locking gear 12 and locking lever 14 (see FIG. 1). This geometry facilitates formation of the guide plate 18 from a single piece of bent or machined material such as a metal or other material that might be molded The guide plate 18 further includes a second side wall 68 opposite and generally facing the first side wall 67 in which the alignment pad 38, rack 44A, detents 51 and opening 35 are formed. This second side wall 68 forms the first portion 36 of the guide plate 18. As such, the guide plate 18 may be preferably formed as a monolithic or one-piece body with these various formations formed therein to perform the above-described functions.

Movement of the guide plate 18 pulls a locking lever tooth 19 of the locking lever 14 into contact with the set of teeth 20 on an outer circumference 12A of the locking gear 12. The meshed contact between the locking lever 14 and locking gear 12 places the compact park lock assembly 10 in a locked, Park, position. Movement of the actuator gear pinion 42 in the reverse direction pulls guide plate 18 and roller assembly 15 in the opposite rightward direction so that the locking lever 14 moves radially away from the locking gear 12, thus placing the compact park lock assembly 10 back into an unlocked position. During this unlocking movement, the roller 16 rolls to the right along the ramped end 25, while the other roller 16 rolls along the abutment plate member 57 to provide vertical support.

Figure 4:
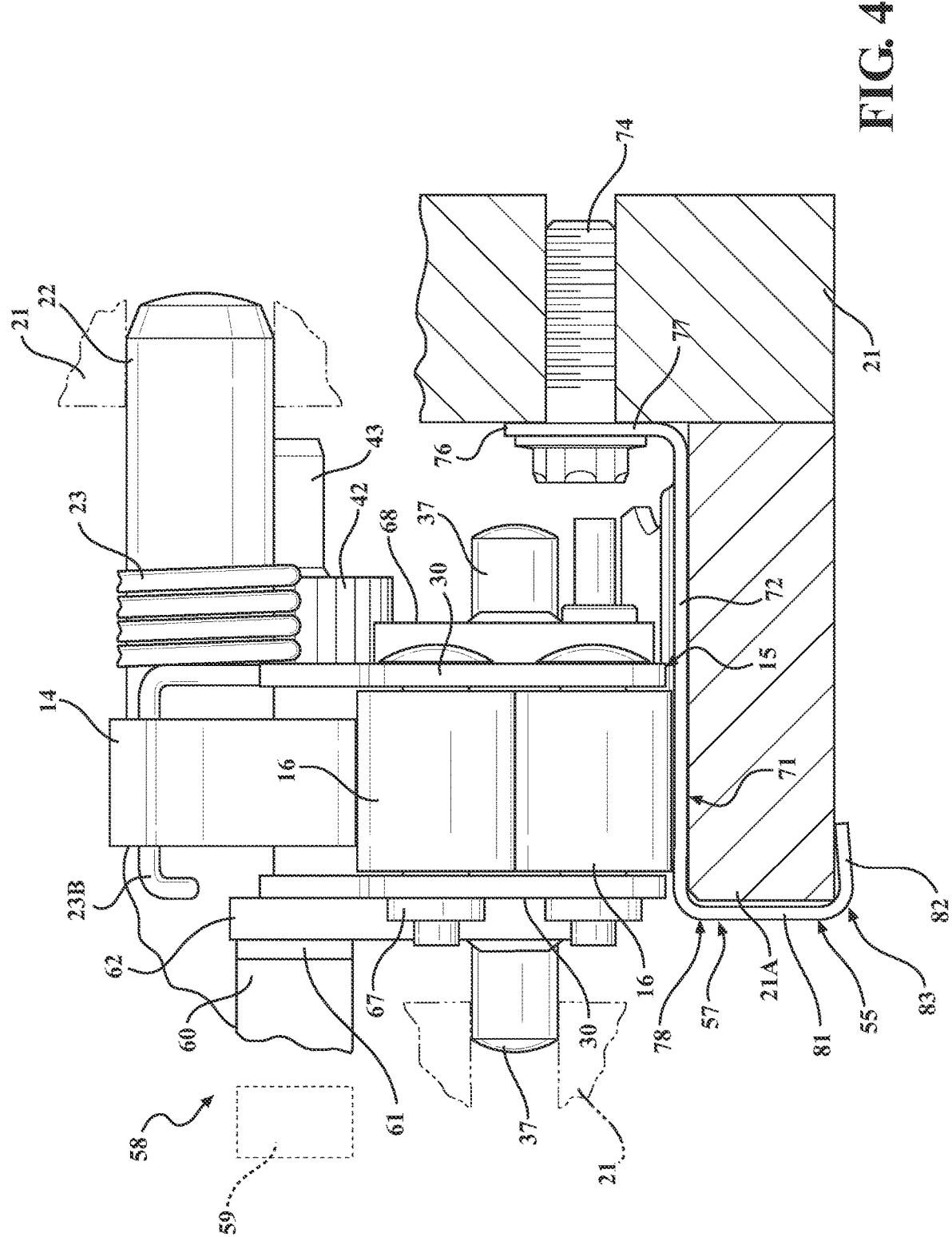
FIG. 4 is a cross sectional view of the compact park lock assembly as viewed end-wise having the abutment plate member with the combined spring feature attached to a lock housing.

Referring to FIGS. 3 and 4, the park lock assembly 10 also includes the abutment plate member 57, which is depicted with a combined spring feature 55. The abutment plate member 57 may be a single member made of two sections with different functions. The first section is an abutment plate section 71 which has the function of supporting the guide plate 18 and the second roller 16 adjacent thereto.

The abutment plate section 71 has a body portion 72 which contains a stiffening feature 73. The stiffening feature 73 reduces deflection of the abutment plate section 71. The abutment plate section 71 is directly attached to the lock housing 21 by at least one bolt or other fastener 74 (See FIG. 4) which passes through a respective opening 75 in a first edge 76 of the abutment plate section 71, wherein the first edge 76 is defined by a side wall 77 upstanding from the body portion 72. In some embodiments there may be more than one opening 75 in the first edge 76 to accommodate multiple fasteners 74. The first edge 76 and side wall 77 are perpendicular to the body portion 72.

The attachment to the lock housing 21 is further reinforced by a second edge 78 of the abutment plate section 71. The second edge 78 is made up of a first portion 81 and a second portion 82. The first portion 81 is perpendicular to the body portion 72 of the abutment plate section 71. The second portion 82 of the second edge 78 is perpendicular to the first portion 81 and parallel to the body portion 72. Together the first portion 81 and second portion 82 of the second edge 78 defined a generally U-shaped, channel-like clip section 83 to tight-fittingly engage the housing 21 by wrapping around the lock housing 21. Preferably, the clip section 83 opens sidewardly in the same direction as the openings 75 so that the clip section 83 is slid onto an edge of the housing 71 to hold the one side of the abutment plate member 57 in place without fasteners, while the fasteners 74 are installed to hold the other side of the abutment plate member 57. The clip section 83 thereby locates the abutment plate member 57 and holds same in position by a fastener-free connection until the bolts or other fasteners 74 are installed on the other side.

Finally extending from the abutment plate section 71 is the spring section 56, which preferably extends in cantilevered relation from the adjacent edge of the body portion 72 near the stiffening feature 73. The spring section 56 has the spring feature 55 on the distal end thereof, which interacts with the detent feature 50 of the guide plate 18 as described above. The spring feature 55 is shaped to interlock with the detent feature 50 of the guide plate 18 in order to restrain movement and in particular, has a rib-like shape with an arcuate outer surface that may be formed by a roller 55A and that allows the detent feature 50 to project or seat into the detents 51 and slide therebetween during movement of the guide plate 12. As the rib-like spring feature 55 slides between the detents 51, the spring section 56 flexes downwardly and then back upwardly. The spring section 56 is preferably formed of a relatively stiff but resiliently bendable or flexible material such as a spring steel that allows flexing of the spring section 56. Further, this resilient flexing would also allow the above-described clip section 83 to tightly grip a housing edge 21A (FIG. 4) if so desired.

Optionally, the abutment plate member 57 might include an alignment feature 85 that may project a small distance from the first portion 81 forming the clip section 83, such as in the form of a tab, and may mate with a corresponding alignment feature such as a bore or other recess on the housing edge 21A to help locate the assembly on the housing 21.

Therefore, in one aspect, the present invention may have the guide plate 18 configured to perform multiple functions including aligning the park lock assembly 10 during assembly, receiving input loads directly from a pinion drive gear arrangement to improve torque transmission, position and restrain movement of the guide plate 18 between the locked and unlocked positions, and provide for sensing of the position of the locking lever 14 during operation. The guide plate 18 may be formed as a single-piece, integrated component as described above. In a further aspect of the invention, the abutment plate member 57 can facilitate mounting of the compact park lock assembly 10, support a spring section 56 to restrain the guide plate 18, form a clip section 83 to engage the housing 21 on one side, incorporate fastener features to secure the abutment plate member 57 to the housing on another side, and optionally include an alignment feature 85 to align the abutment plate member 57 relative to the housing 21. In this embodiment, the abutment plate member 57 may be formed as a single-piece, integrated component.

Figure 5:
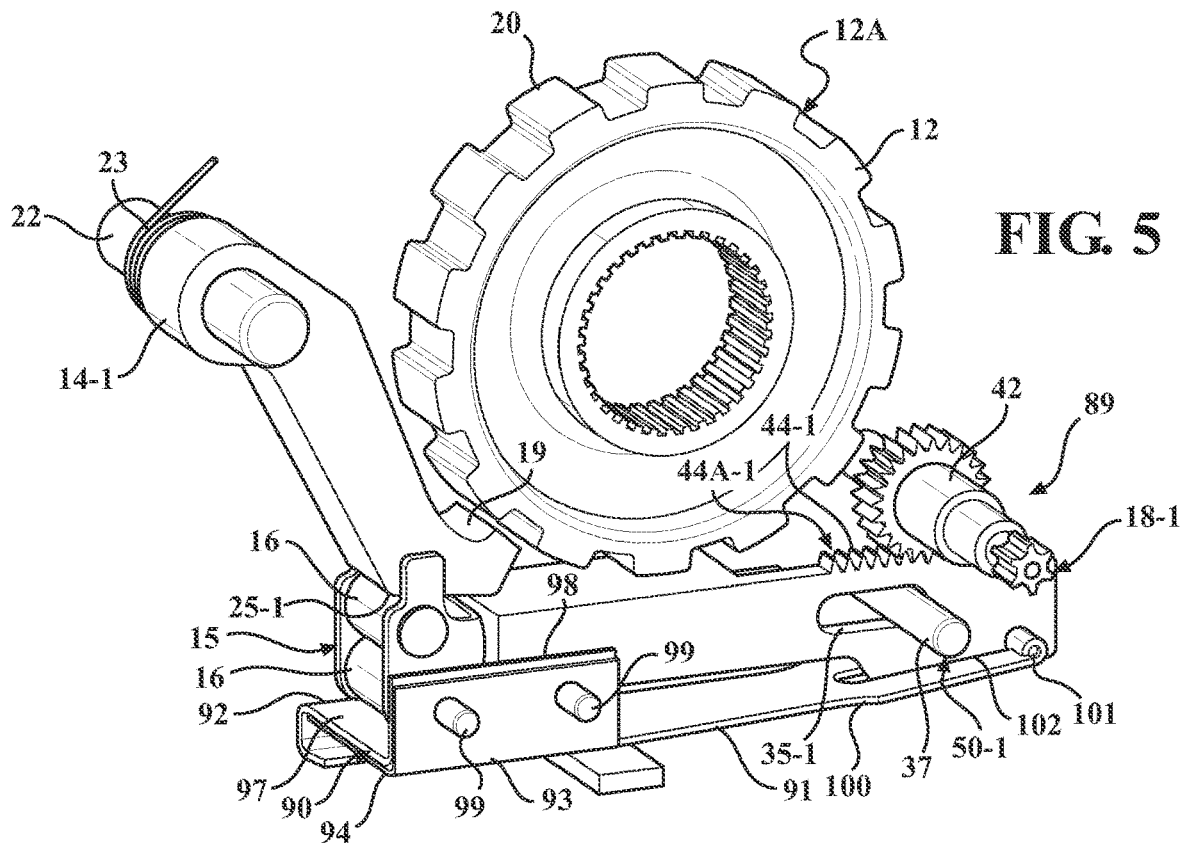
FIG. 5 is a perspective side view of a second embodiment of the compact park lock assembly having an abutment plate member with a separate spring feature.
Figure 6:
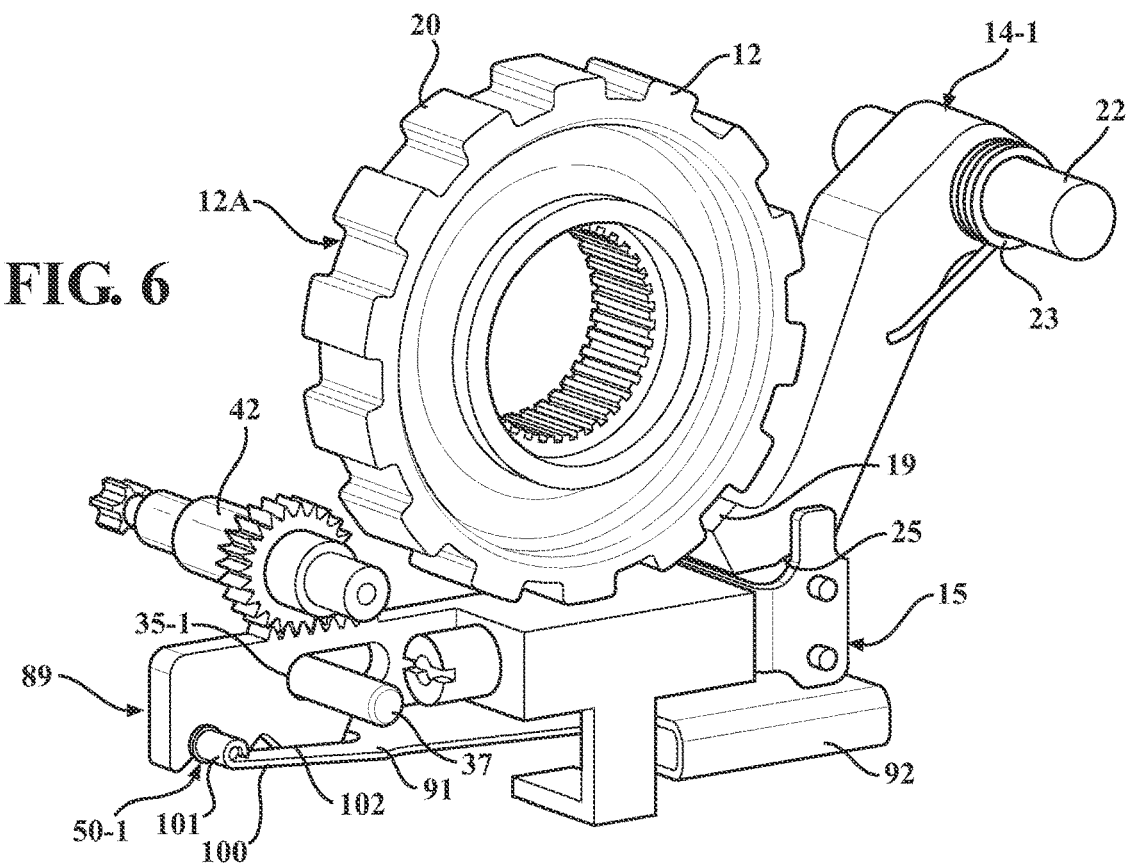
FIG. 6 is another perspective side view of the compact park lock assembly having the abutment plate member that has the separate spring feature.

Referring to FIGS. 5 and 6, a park lock assembly 89 is shown with an alternative embodiment of the abutment plate member designated by reference numeral 90 wherein the abutment plate member 90 is shown as a multi-piece component with a separate spring section 91. The spring section 91 is no longer an extension of the abutment section 92 but rather a separate piece. The spring section 91 has a first edge 93 and a body portion 94. The body portion 94 is parallel to and in direct contact with the body portion 97 of the abutment plate member 90 when fully assembled (See FIG. 5). The first edge 93 of the spring section 91 is perpendicular to the body portion 94. The first edge 93 of the spring section 91 is parallel to and in direct contact with the first edge 98 of the abutment plate member 90. The first edge 93 of the spring section 91 has openings which align with the openings of the first edge 98 of the abutment plate member 90. Each bolt 99 or other fastener passes through both the opening of the first edge 93 of the spring section 91 and the opening of the first edge 98 of the abutment plate member 90 and into the housing 21 of the lock assembly when fully assembled. Extending from the body portion of the spring section 91 is a spring arm 100 which ends at the spring feature 101. The spring arm 100 may include a slot 102 to accommodate a lower edge section of the guide member 18-1 vertically therethrough to allow for an increased height or thickness of the guide member 18-1 in the region of the detent feature 50-1.

The park lock assembly 89 is configured for use with the locking gear 12 for engagement with the teeth 20 formed about the outer gear circumference 12A. While the abutment plate member 90 may be adapted for use with the components of the park lock assembly 10 described above, the park lock assembly 89 may be used in an alternate configuration of the locking lever 14 designated herein as locking lever 14-1. The locking lever 14-1 is mounted in a modified geometry with the pivot pin 22 relocated and offset to a side of the locking gear 12 spaced circumferentially away from the second side of the locking gear 12 which is adjacent the park lock assembly 89. The locking lever tooth 19 is configured the same but the ramped surface 25-1 is formed toward the end lever face rather than the side face used in FIG. 1. The engagement of the locking lever 14-1 with the locking gear 12 will still function the same as that described above.

To pivot the locking lever 14-1 between the locking and unlocking positions, the park lock assembly 89 still uses a guide member 18-1, which incorporates the same basic structures as guide plate 18 except that the guide member 18-1 is formed from a body of solid material, such as by machining. The modified guide member 18-1 is formed with the common configuration of an alignment opening 35-1 cooperating with the dowel 37, drive teeth 44-1 forming a rack 44A-1, and a detent feature 50-1. Further, the guide member 18-1 slidably supports the park lock roller assembly 15 described above, wherein the roller 16 rolls along and drives the ramped end 25-1 of the locking lever 14-1. The actuator gear pinion 42 meshes with or engages the teeth 44-1 of the rack 44A-1, and rotates about a shaft oriented substantially parallel to the gear axis of the park lock gear 12 similar to FIG. 1. The guide member 18-1 functions substantially the same as guide member 18 and a further discussion of the operation of the park lock assembly 89 is not required for an understanding of this inventive embodiment.

Figure 7:
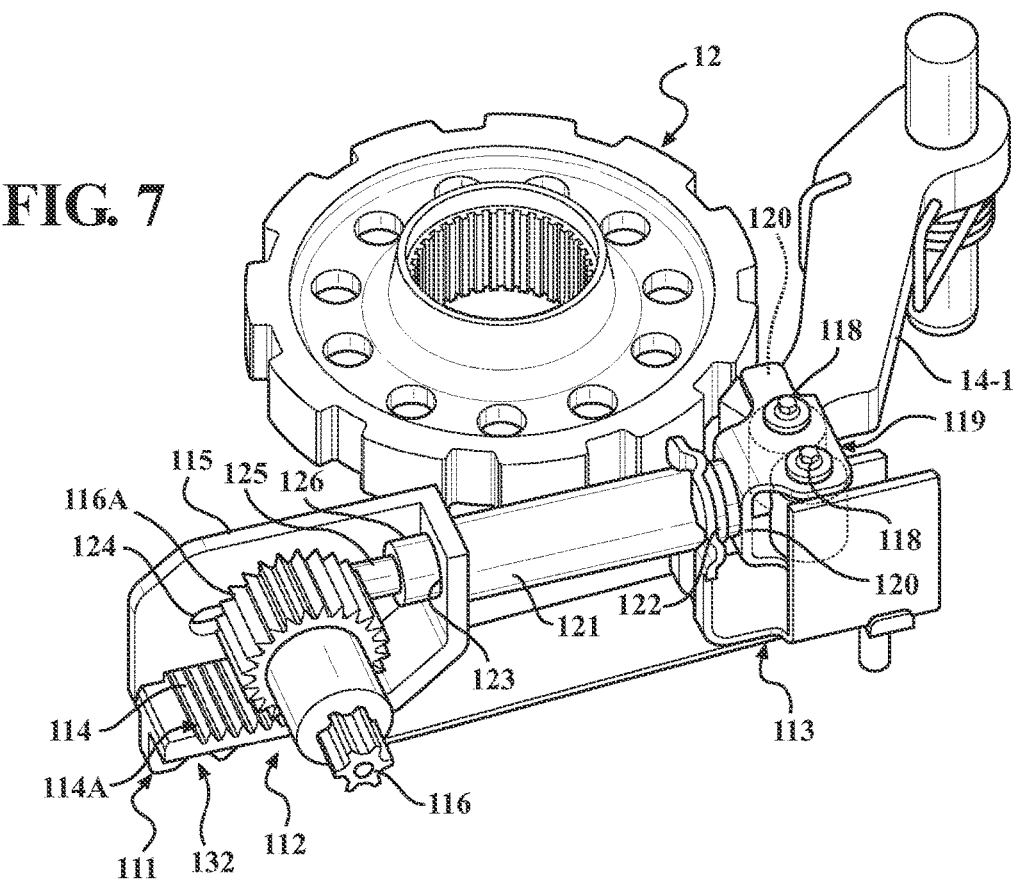
FIG. 7 is a perspective bottom view of a third embodiment of the compact park lock assembly with a guide plate having a first section and a second section which are separate pieces.
Figure 8:
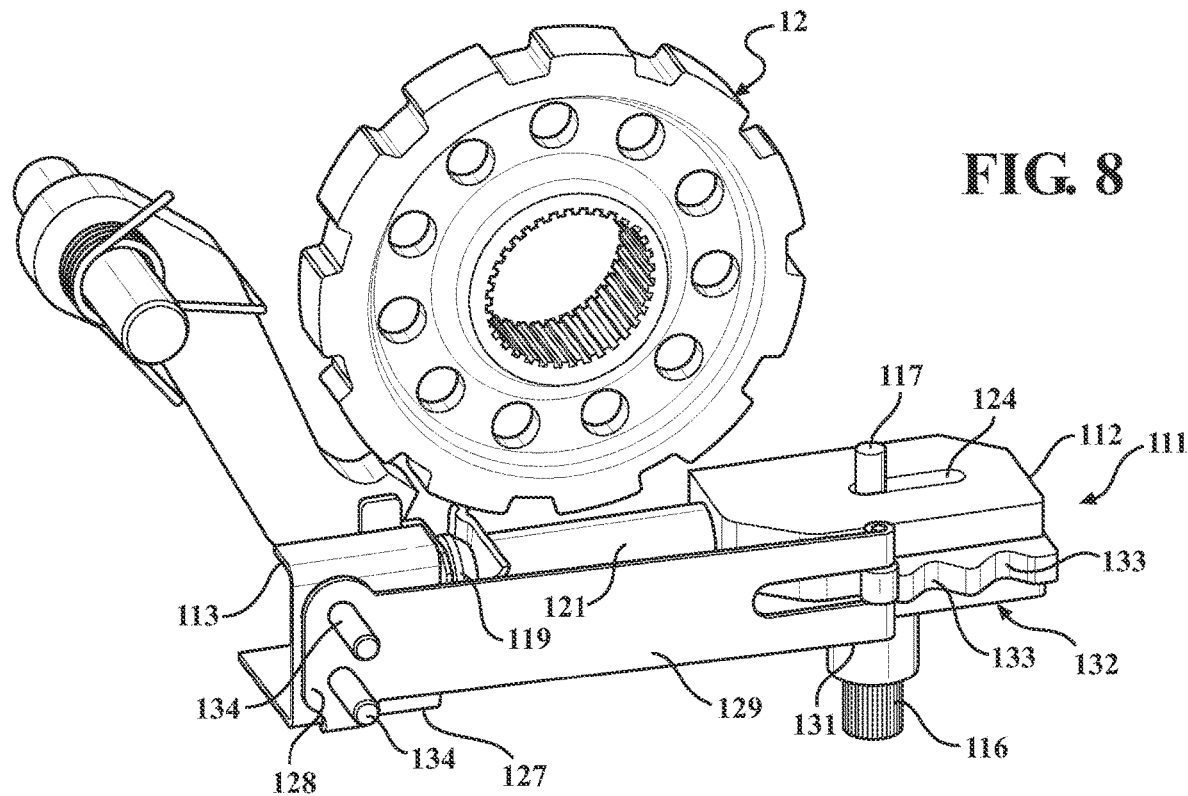
FIG. 8 is a perspective side view of the compact park lock assembly with the guide plate with the first section and the second section as separate pieces.

Referring to FIGS. 7 and 8, an alternate park lock assembly 110 is shown with an alternative embodiment of the guide plate designated by reference numeral 111, wherein the first section 112 and second section 113 of the guide plate or guide member 111 are separate pieces.

The first section 112 still contains the alignment opening 124 however the teeth 114 are no longer located on the first edge 115. Rather the teeth 114 are formed as a rack 114A located on an internal floor of the first section 112 of the guide plate 111. This eliminates the need for the separate housing dowel 37 as the actuator gear pinion 116 now has an end dowel 117 that passes through the alignment opening 124. In this embodiment the actuator gear pinion 116 still has the function of providing input load to the guide plate 111 with the torque transferred linearly along the length of the guide plate 111 through the meshed guide plate teeth 114 and gear pinion teeth 116A. Further, the actuator gear pinion 116 also has the function of providing alignment which was the function of the housing dowel 37 in the previous embodiments. However, the actuator gear pinion 116 rotates about a shaft axis that is oriented transverse or even perpendicular to the gear axis about which the gear 12 rotates. This allows the actuator gear pinion 116 to be oriented generally at an angle or more preferably, at a right angle compared to the orientation of the park gear 12. In this regard, the rack teeth 114 are oriented at a right angle or sidewardly relative to the rack teeth 44 and 44-1 described above.

The locking lever bracket 118 is still formed as part of a park lock roller assembly 119, which supports the rollers 120 attached to the second portion 113 of the guide plate 111. However, now there is a guide plate connector 121, which extends from the lever bracket 118 through an opening 122 in the second portion 113 and an opening 123 in the first portion 112 and rigidly joins the first portion 112 and second portion 113 together. The guide plate connector 121 transfers the motion of the first portion 112 of the guide plate 111 to the second portion 113 of the guide plate 111. The reversible transfer of motion then moves the locking lever 14-1 into a locked position with the locking gear 12 or an unlocked position with the locking gear 12. The guide plate connector 121 further includes an internal shaft rod 125 and shaft collar 126 formed similar to the shaft rod 31 and shaft collar 32.

Finally this embodiment contains an abutment plate member 127 formed with an abutment plate section 128 and a spring section 129 which connect together with the second portion 113. The spring section 129 has the spring feature 131 and is attached via bolts or other fasteners 134 to the second portion 113 of the guide plate 111 and the housing 21. The free end of the spring section 129 includes the spring feature 131, which may be formed with a curved outer surface like a roller, wherein the spring feature 131 engages with the detent feature 132 on the first portion 112 of the guide plate 111. The detent feature 132 is formed with detents 133 like the detents 51 described above.

In this embodiment, the guide plate 111 may be formed as a multi-piece by the first and second portions 112 and 113, rather than being formed as a single-piece, integrated component. The roller assembly 119 still functions the same as the roller assembly 15 to actuate the locking lever 14-1, which also be referenced as a pawl.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. A park lock assembly for locking and unlocking a park lock gear of a vehicle comprising:
   a locking lever which is pivotable into and out of engagement with a park lock gear of a vehicle between an unlocked position and a locked, Park, position;
   a guide plate, which slidably supports a park lock roller assembly having rollers which contact said locking lever and actuate said locking lever to lock and unlock the park lock gear, said guide plate being displaceable in a movement direction between locking and unlocking positions for displacing said park lock roller assembly to pivot said locking lever;
   an abutment plate member operatively engaged with said guide plate, which includes a spring section for retaining said guide plate in said locking position and said unlocking position; and
   said guide plate including an alignment formation for maintaining alignment of said guide plate during said movement thereof, a rack comprising a plurality of gear teeth that is engagable with and drivable by an actuator gear pinion to displace said guide plate in said movement direction, and a detent feature which is engagable with said spring section for said retaining of said guide plate in said locking position or said unlocking position.

2. The park lock assembly of claim 1, wherein said locking lever has a first end and a second end, said first end being a ramped end and said second end being pivotally mounted on a pivot pin.

3. The park lock assembly of claim 2, wherein said locking lever has a locking tooth at said first end, and said ramped end contacts said roller assembly wherein an adjacent said roller in contact with said ramped end pivots said locking lever as said roller assembly is pulled by said guide plate to said locking position.

4. The park lock assembly of claim 3, wherein said locking tooth of said locking lever is configured to mesh with a plurality of teeth on an outer surface of said park lock gear to lock a transmission of a vehicle into a park position.

5. The park lock assembly of claim 1, wherein said guide plate acts as a support for said park lock roller assembly and said guide plate is movably supported on said abutment plate member.

6. The park lock assembly of claim 1, wherein said teeth on said guide plate extend in said movement direction in which said guide plate moves and are configured to receive a reversible input load from the actuator gear pinion, which acts in said movement direction.

7. The park lock assembly of claim 1, wherein said rack is disposed on a first edge of said guide plate, and said detent feature is disposed on a second edge of said guide plate opposite to said first edge, said teeth extending in said movement direction in which said guide plate moves and said detent feature comprises a plurality of detents which are spaced from each other in said movement direction.

8. The park lock assembly of claim 7, wherein said abutment plate member includes said spring section which extends in cantilevered relation to a embody portion thereof, said spring section including a spring feature on an end portion thereof and said spring section being resiliently flexible to bias said spring feature into a respective one of said detents while permitting movement thereof out of said detent to another said detent during said movement of said guide plate.

9. The park lock assembly of claim 8, wherein said guide plate and said abutment plate member are formed each as a single-piece component.

10. The park lock assembly of claim 1, wherein said abutment plate member is formed as a single-piece component shaped to include said spring section attached to a body portion in cantilevered relation, said body portion further supporting an edge clip section on one side which is tight fittingly engagable with a housing and a side wall on an opposite side, which is fastenable to the housing by fasteners.

11. A park lock assembly for locking and unlocking a park lock gear of a vehicle comprising:
   a locking lever which is pivotable into and out of engagement with a park lock gear between an unlocked position and a locked, Park, position;
   a guide plate, which slidably supports a park lock roller assembly having rollers which contact said locking lever and actuate said locking lever to lock and unlock the park lock gear, said guide plate being displaceable in a movement direction between locking and unlocking positions for displacing said park lock roller assembly in said movement direction to pivot said locking lever;
   an abutment plate member operatively engaged with said guide plate, which includes a spring section for retaining said guide plate in said locking position and said unlocking position, said abutment plate member being formed as a single-piece comprising a body portion and said spring section which extends in cantilevered relation from said body portion; and
   said guide plate including an alignment formation for maintaining alignment of said guide plate during movement thereof, a rack comprising a plurality of gear teeth that is engagable with and drivable by an actuator gear pinion, and a detent feature which is engagable with said spring section for said retaining of said guide plate, said guide plate being formed as a single-piece defined by first and second side walls, and first and second end walls oriented transverse to said first and second side walls, said first and second side walls being disposed in parallel relation by said second end wall extending therebetween.

12. The park lock assembly of claim 11, wherein said locking lever has a first end and a second end, said first end being a ramped end and said second end being pivotally mounted on a pivot pin, said locking lever having a locking tooth at said first end, and said ramped end contacting said roller assembly wherein an adjacent said roller contacts said ramped end and pivots said locking lever as said roller assembly is pulled by said guide plate in said movement direction to said locking position.

13. The park lock assembly of claim 12, wherein said locking tooth of said locking lever is configured to mesh with a plurality of teeth on an outer surface of said locking gear to lock a transmission of a vehicle into a park position, said locking lever disposed sidewardly adjacent to said guide plate to act on said park lock gear adjacent to said guide plate.

14. The park lock assembly of claim 12, wherein said locking tooth of said locking lever is configured to mesh with a plurality of teeth on an outer surface of said locking gear to lock a transmission of a vehicle into a park position, said locking lever disposed to one side of said guide plate to act on said park lock gear at a location spaced circumferentially from a position of said guide plate.

15. The park lock assembly of claim 11, wherein said guide plate acts as a support for said park lock roller assembly, wherein said first and second end walls slidably support said park lock roller assembly, said guide plate being movably supported on said abutment plate member so as to move in said movement direction, and said park lock roller assembly being movable in said movement direction relative to said guide plate.

16. The park lock assembly of claim 11, wherein said teeth on said guide plate extend in said movement direction in which said guide plate moves and are configured to receive an input load from the actuator gear pinion in said movement direction.

17. The park lock assembly of claim 16, wherein said rack is disposed on a first edge of said first side wall of said guide plate, and said detent feature is disposed on a second edge of said first side wall of said guide plate opposite to said first edge, said teeth extending in said movement direction in which said guide plate moves and said detent feature comprising a plurality of detents which are spaced from each other in said movement direction.

18. The park lock assembly of claim 17, wherein said first and second side walls include respective first and second alignment formations.

19. The park lock assembly of claim 11, wherein said abutment plate member includes said spring section which extends in cantilevered relation from said embody portion thereof in said movement direction, said spring section including a spring feature on an end portion thereof and said spring section being resiliently flexible to bias said spring feature in a direction transverse to said movement direction into said detent feature while permitting movement thereof out of said detent feature during said movement of said guide plate to retain said guide plate in one of said locking and unlocking positions.

20. The park lock assembly of claim 19, wherein said abutment plate member is shaped to include said spring section attached to said body portion in cantilevered relation, said body portion further supporting an edge clip section on one side which is tight fittingly engagable with a housing without fasteners and a side wall on an opposite side, which is fastenable to the housing by fasteners.

21. The park lock assembly of claim 11, wherein said second side wall includes a flange and a sensor for detecting a position of said locking lever to control operation of said actuator gear pinion.

* * * * *